United States Patent Office 3,280,112
Patented Oct. 18, 1966

3,280,112
STEROIDO[2,3-d]TRIAZOLES
Robert G. Christiansen, Schodack, N.Y., assignor to Sterling Drug Inc., New York, N.Y., a corporation of Delaware
No Drawing. Filed Jan. 28, 1963, Ser. No. 254,484
6 Claims. (Cl. 260—239.5)

This invention relates to new heterocyclic steroids and in particular is concerned with steroido[2,3-d]triazoles of the androstane series, with their preparation, and with intermediates therefor.

The compounds of the invention in the free base form are of the following structural formula:

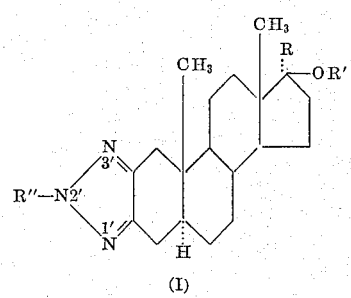

(I)

wherein R is hydrogen or lower-alkyl and R' and R'' are hydrogen or lower-carboxylic acyl.

In the above Formula I, R, when lower-alkyl, can be an alkyl group having from one to about four carbon atoms, thus including methyl, ethyl, propyl, isopropyl, butyl and the like.

In the above Formula I, R' and R'' when lower-carboxylic acyl, can be derived from carboxylic acids having from one to about ten carbon atoms, conventionally employed in the steroid art, and having a molecular weight less than about 200. Representative of the acyl radicals which can be present are lower-alkanoyl radicals, e.g., formyl, acetyl, propionyl, butyryl, isobutyryl, caproyl, heptanoyl, octanoyl, trimethylacetyl, and the like; carboxy-lower-alkanoyl radicals, e.g., succinyl (β-carboxypropionyl); cycloalkyl-lower-alkanoyl radicals, e.g., β-cyclopentylpropionyl, β-cyclohexylpropionyl, and the like; monocarbocyclic aroyl radicals, e.g., benzoyl, p-toluyl, p-nitrobenzoyl, 3,4,5-trimethoxybenzoyl, and the like; monocarbocyclic aryl-lower-alkanoyl or -alkenoyl radicals, such as phenylacetyl, β-phenylpropionyl, cinnamoyl, and the like; and monocarbocyclic aryloxy-lower-alkanoyl radicals, such as p-chlorophenoxyacetyl, and the like.

The compounds of the invention are prepared according to the following reaction sequence:

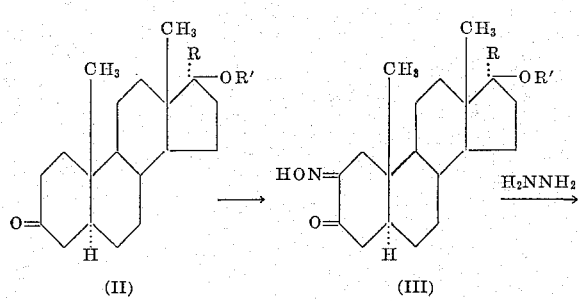

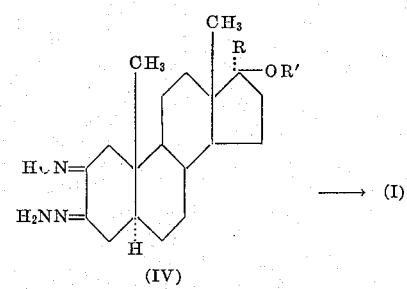

A 3-oxo-androstane of Formula II (R and R' have the same meaning given hereinabove) is treated with a lower-alkyl nitrite in the presence of a strong base, such as an alkali metal alkoxide or amide, for example, potassium tertiary-butoxide. There is thus produced the corresponding 2-isonitroso derivative (III). If the starting material is an ester (R' is lower-carboxylic acyl), the ester will be largely saponified during the work-up of the reaction, but the resulting 17-hydroxy compound (III, R' is H) can, if desired, be reesterified by conventional esterification reactions. The compounds of Formula III are disclosed and claimed in the copending application of R. O. Clinton, Serial No. 254,479, filed January 28, 1963.

The 2-isonitroso-3-oxo-androstane (III) is then caused to react with hydrozine giving the hydrazone derivative (IV). The latter is then cyclized by heating in the presence of a lower-alkanoic acid anhydride and an alkali metal lower-alkanoate, for example, acetic anhydride and sodium acetate, to give the desired triazole of Formula I. The initial product produced is one where R'' is an acyl group derived from the anhydride used in the reaction medium, and if a free 17β-hydroxy group is present in the starting material it will also be at least partially esterified during the cyclization procedure. However, the N-acyl group is frequently partially cleaved during the work-up and purification procedures, giving some of the compound where R'' is H. The N-acyl and/or O-acyl compounds can, of course, be hydrolyzed and the resulting amine, alcohol or amine-alcohol can be reacylated with any desired acylating agent by conventional procedures.

The compounds of Formula I are basic in nature and readily form acid-addition salts upon addition of strong acids. These acid-addition salts are the full equivalent of the free bases for the purposes of the present invention. The salts preferably have anions which are pharmacologically acceptable, that is, anions which do not appreciably increase the toxicity of the compound as a whole toward animal organisms. Such anions include, for example, the chloride, bromide, iodide, sulfate or acid sulfate, methanesulfonate, benzenesulfonate, and the like. Salts having toxic anions are, however, useful in that they serve as characterizing derivatives of the basic steroids and serve as intermediates in the purification of the free bases.

Endocrinological studies of the compounds of the invention have shown that they possess useful electrolyte modifying properties. In particular they cause retention of calcium.

The compounds of the invention can be prepared for use by dispersing them in an aqueous suspension or by dissolving them in a pharmacologically acceptable oil or oil-water emulsion for parenteral administration; or by incorporation in tablet form with excipients for oral administration.

The structures of the compounds of the invention were established by the mode of synthesis, by ultraviolet and infrared spectral analysis, and by the fact that the values found upon elementary analysis corresponded to the values calculated for the assigned structures.

The following examples will further illustrate the invention without the latter being limited thereby.

PREPARATION OF INTERMEDIATES

The following intermediates were prepared in accordance with the disclosure of the copending application of R. O. Clinton, Serial No. 254,479, filed January 28, 1963.

2 - isonitroso - 17α - methylandrostan - 17β - ol - 3-one [III; R is $CH_3$, R' is H]: A solution of 6.09 g. of 17α-methylandrostan-17β-ol-3-one in 100 ml. of tetrahydrofuran was added to a solution of potassium tertiary-butoxide (prepared from 1.56 g. of potassium and 100 ml. of tertiary-butyl alcohol) at room temperature. A solution of 2.27 g. of n-butyl nitrite in 40 ml. of tertiary-butyl alcohol was then added over a period of fifteen minutes, and the mixture was stirred for five hours and allowed to stand overnight. The reaction mixture was poured into 2 liters of water and extracted with two 250 ml. portions of methylene dichloride and two 500 ml. portions of ether. The combined extracts were extracted with five 500 ml. portions of 1 N sodium hydroxide solution. The alkaline extracts were acidified, and the precipitated product was extracted with ether, and the extracts were washed with water and saturated sodium chloride solution, and dried over anhydrous sodium sulfate. The ether solution was concentrated, and the residue combined with the product from another run starting from 12.16 g. of 17α-methylandrostan-17β-ol-3-one and placed on a column of 500 g. of silica gel as a suspension in ether-methylene dichloride-pentane 1:1:2. The column was eluted with the same solvent mixture and then with ether-methylene dichloride-pentane 2:1:1. The solid fractions were recrystallized from methanol to give 2-isonitroso-17α-methylandrostan-17β-ol-3-one in the form of colorless needles, M.P. 269.4–273.0° (corr.), $[\alpha]_D^{25}=+45.0°$ (1% in chloroform); ultraviolet maximum at 244 m$\mu$ ($\epsilon=7,300$); infrared absorption at 2.94, 3.16, 5.85 and 6.23$\mu$.

2-isonitrosoandrostan-17β-ol-3-one [III; R and R' are H] was prepared from 11.00 g. of androstan-17β-ol-3-one, 3.90 g. of n-butyl nitrite and potassium tertiary-butoxide (from 1.95 g. of potassium) according to the procedure described above in the preparation of 2-isonitroso-17α-methylandrostan-17β-ol-3-one. The crude product was recrystallized directly from methanol without chromatographic purification to give 2-isonitrosoandrostan-17β-ol-3-one in the form of colorless needles, M.P. 283° C. (corr., dec.), $[\alpha]_D^{25}=+50.3°$ (1% in pyridine); ultraviolet maximum at 243 m$\mu$ ($\epsilon=6,950$); infrared absorption at 2.91, 3.20, 3.45, 5.84 and 6.21$\mu$.

2-isonitrosoandrostan-17β-ol-3-one can be caused to react with acetic anhydride, propionic anhydride, caproyl chloride, succinic anhydride, β-cyclopentylpropionyl chloride, benzoyl chloride, p-nitrobenzoyl chloride, 3,4,5-trimethoxybenzoyl chloride, phenylacetyl chloride or cinnamoyl chloride, by heating in the presence of pyridine, to give, respectively, 17β-acetoxy-2-isonitrosoandrostan-3-one,
17β-propionoxy-2-isonitrosoandrostan-3-one,
17β-caproyloxy-2-isonitrosoandrostan-3-one,
17β-(β-carboxypropionoxy)-2-isonitrosoandrostan-3-one,
17β-(β-cyclopentylpropionoxy)-2-isonitrosoandrostan-3-one,
17β-benzoyloxy-2-isonitrosoandrostan-3-one,
17β-(p-nitrobenzoyloxy)-2-isonitrosoandrostan-3-one,
17β-(3,4,5-trimethoxybenzoyloxy)-2-isonitrosoandrostan-3-one,
17β-phenylacetoxy-2-isonitrosoandrostan-3-one or
17β-cinnamoyloxy-2-isonitrosoandrostan-3-one.

Some acylation of the isonitroso group may result, but these labile derivatives can readily be hydrolyzed by treatment with aqueous alkali under conditions which are too mild to have any effect on the 17-acyloxy group.

*Example 1*

(a) *3-hydrazone of 2-isonitrosoandrostan-17β-ol-3-one* [IV; R and R' are H]: A mixture of 3.19 g. of 2-isonitrosoandrostan-17β-ol-3-one, 5 ml. of hydrazine hydrate and 100 ml. of ethanol was refluxed for three hours. The reaction mixture was concentrated in vacuo by distillation, water was added to the residue, and the solid product collected and dried at 80° C. in vacuo to give 3.16 g. of 3-hydrazone of 2-isonitrosoandrostan-17β-ol-3-one, M.P. 178–190° C. (uncorr.); ultraviolet maxima at 226 and 275 m$\mu$ ($\epsilon=4,420$ and 4,840); infrared absorption at 2.96, 3.44, 6.18, 6.40, 6.81 and 6.91$\mu$.

(b) *17β-acetoxyandrostano[2,3-d]triazole* [I; R is H, R' is $COCH_3$, R" is H]: A mixture of 3.00 g. of 3-hydrazone of 2-isonitrosoandrostan-17β-ol-3-one, 3.00 g. of fused sodium acetate and 20 ml. of acetic anhydride was refluxed for four hours. The reaction mixture was cooled, added to 400 ml. of water, allowed to stand for two hours and extracted with three 60 ml. portions of methylene dichloride. The extracts were washed with 5% sodium bicarbonate solution, dried over anhydrous magnesium sulfate, filtered and concentrated. The residue was taken up in a mixture of 50 ml. of ether, 150 ml. of pentane and a small amount of methylene dichloride, and chromatographed on a column of 200 g. of silica gel. The column was eluted with ether-pentane 1:3 and then with ether-pentane 1:1. The product brought out by the latter eluant was treated with methylene dichloride and the insoluble fraction was separated and recrystallized from chloroform to give 17β-acetoxyandrostano[2,3-d]triazole, M.P. 283.0–285.0° C. (corr.), $[\alpha]_D^{25}=+46.0°$ (1% in chloroform); ultraviolet maximum at 225 m$\mu$ ($\epsilon=7.020$), infrared absorption 3.45, 3.53, 3.68, 5.76, 6.24, 6.61, 6.93 and 8.04$\mu$.

17β-acetoxyandrostano[2,3-d]triazole when heated with a dilute solution of potassium hydroxide in methanol is converted to 17β-hydroxyandrostano[2,3-d]triazole [I; R, R' and R" are H].

*Example 2*

*17β-acetoxyandrostano[2,3-d]-2'-acetyltriazole* [I; R is H, R' and R" are $CH_3CO$]: A mixture of 16.4 g. of 2-isonitrosoandrostan-17β-ol-3-one 3-hydrazone (Example 1, part *a*), 16.4 g. of fused sodium acetate and 100 ml. of acetic anhydride was refluxed with stirring for five and one-half hours. The reaction mixture was kept at room temperature for three days, then poured into ice-water and after one hour extracted with two 200 ml. portions of methylene dichloride. The extracts were washed with 200 ml. of water and two 200 ml. portions of 5% sodium bicarbonate solution and dried over anhydrous magnesium sulfate. The methylene dichloride solution was chromatographed on a column of 400 g. of silica gel, and the column was eluted with methylene dichloride, methylene dichloride-ether 9:1 and methylene dichloride-ether 8:2. The fractions from methylene dichloride-ether were combined and rechromatographed on 400 g. of silica gel using 200 ml. of ether and 200 ml. of pentane to place the product on the column. The column was eluted with ether-pentane 1:1 and the product recrystallized from ether and from ether-pentane 1:1 to give 17β-acetoxyandrostano[2,3-d]-2'-acetyltriazole in the form of colorless prisms, M.P. 150.6–152.0° C. (corr.), $$[\alpha]_D^{25}=+51.4°$$

(1% in chloroform); ultraviolet maximum at 258 m$\mu$ ($\epsilon=21,200$).

By replacing the acetic anhydride and sodium acetate in the procedures of Examples 1, part (*b*), and 2 with propionic anhydride and sodium propionate there can be prepared 17β-propionoxyandrostano[2,3-d]triazole [I; R is H, R' is $COCH_2CH_3$, R" is H] and 17β-propionoxyandrostano[2,3-d]-2'-propionyltriazole [I; R is H, R' and R" are $CH_3CH_2CO$].

By replacing the 2-isonitrosoandrostan-17β-ol-3-one in Example 1, part (*a*), by the compounds listed in the left hand column of the following table, and carrying through the procedures described in Examples 1 or 2, there can be produced the compounds listed in the right hand column of the following table:

| Starting Material | Final Products |
|---|---|
| 2-isonitroso-17α-methylandrostan-17β-ol-3-one. | 17β-hydroxy-17α-methylandrostano[2,3-d]triazole.<br>17β-acetoxy-17α-methyl[2,3-d]triazole.<br>17β-acetoxy-17α-methyl[2,3-d]-2'-acetyltriazole.<br>17β-hydroxy-17α-methyl[2,3-d]-2'-acetyltriazole. |
| 17β-propionoxy-2-isonitrosoandrostan-3-one. | 17β-propionoxyandrostano[2,3-d]triazole.<br>17β-propionoxyandrostano[2,3-d]-2'-acetyltriazole. |
| 17β-caproyloxy-2-isonitrosoandrostan-3-one. | 17β-caproyloxyandrostano[2,3-d]triazole.<br>17β-caproyloxyandrostano[2,3-d]-2'-acetyltriazole. |
| 17β-(β-carboxypropionoxy)-2-isonitrosoandrostan-3-one. | 17β-(β-carboxypropionoxy)-androstano[2,3-d]triazole.<br>17β-(β-carboxypropionoxy)-androstano[2,3-d]-2'-acetyltriazole. |
| 17β-(β-cyclopentylpropionoxy)-2-isonitrosoandrostan-3-one. | 17β-(β-cyclopentylpropionoxy)-androstano[2,3-d]triazole.<br>17β-(β-cyclopentylpropionoxy)-androstano[2,3-d]-2'-acetyltriazole. |
| 17β-benzoyloxy-2-isonitrosoandrostan-3-one. | 17β-benzoyloxyandrostano[2,3-d]triazole.<br>17β-benzoyloxyandrostano[2,3-d]-2'-acetyltriazole. |
| 17β-(p-nitrobenzoyloxy)-2-isonitrosoandrostan-3-one. | 17β-(p-nitrobenzoyloxy)-androstano[2,3-d]triazole.<br>17β-(p-nitrobenzoyloxy)-androstano[2,3-d]-2'-acetyltriazole. |
| 17β-(3,4,5-trimethoxybenzoyloxy)-2-isonitrosoandrostan-3-one. | 17β-(3,4,5-trimethoxybenzoyloxy)-androstano[2,3-d]triazole.<br>17β-(3,4,5-trimethoxybenzoyloxy)-androstano[2,3-d]-2'-acetyltriazole. |
| 17β-phenylacetoxy-2-isonitrosoandrostan-3-one. | 17β-phenylacetoxyandrostano[2,3-d]triazole.<br>17β-phenylacetoxyandrostano[2,3-d]-2'-acetyltriazole. |
| 17β-cinnamoyloxy-2-isonitrosoandrostan-3-one. | 17β-cinnamoyloxyandrostano[2,3-d]triazole.<br>17β-cinnamoyloxyandrostano[2,3-d]-2'-acetyltriazole. |

I claim:
1. 17β-(lower - carboxylic acyloxy)androstano[2,3-d]triazole.
2. 2'-(lower-carboxylic acyl)-17β - (lower - carboxylic acyloxy)androstano[2,3-d]triazole.
3. 17β-acetoxyandrostano[2,3-d]triazole.
4. 17β-acetoxyandrostano[2,3-d]-2'-acetyltriazole.
5. A compound of the formula

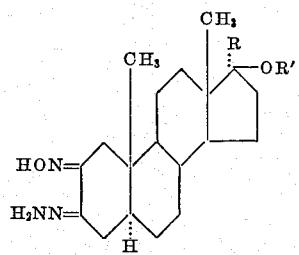

wherein R is a member of the group consisting of hydrogen and lower-alkyl, and R' is a member of the group consisting of hydrogen and lower-carboxylic acyl.
6. The 3-hydrazone of 2-isonitrosoandrostan-17β-ol-3-one.

References Cited by the Examiner

Benson et al.: Chem. Rev., 46, pp. 1–68 (1950), pp. 1, 2, 20 and 37–38 relied on.

Migrdichian, V.: Organic Synthesis. N.Y., Reinhold, vol. 1, 1957, p. 153.

Nathansohn et al.: Experientia, 18, pp. 57 and 58 (1962).

ELBERT L. ROBERTS, *Acting Primary Examiner*.

LEWIS GOTTS, *Examiner*.

THOMAS M. MESHBESHER, *Assistant Examiner*.